United States Patent Office 2,991,465
Patented July 4, 1961

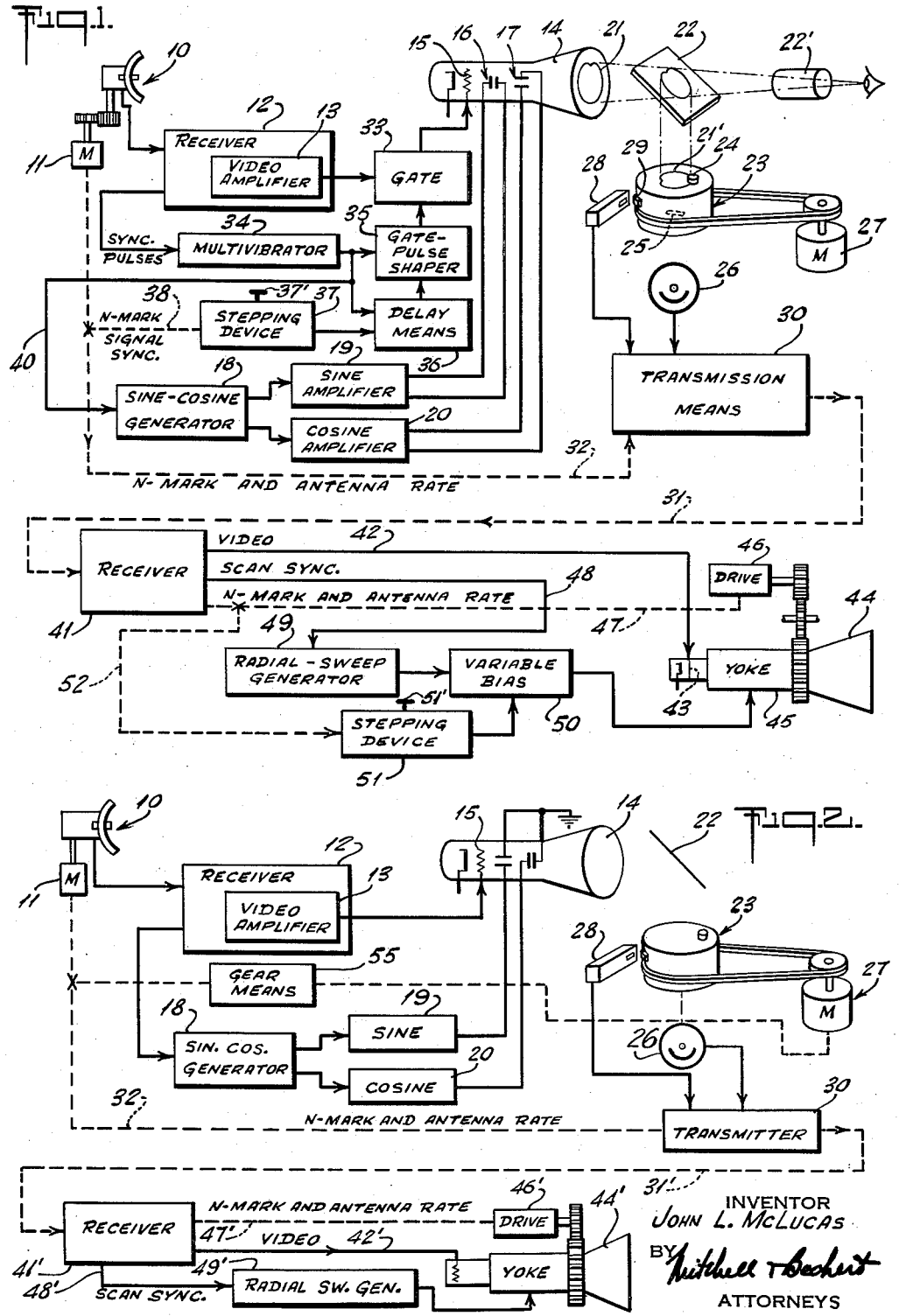

2,991,465
BAND-COMPRESSION DEVICE
John L. McLucas, State College, Pa., assignor, by mesne assignments, to HRB-Singer, Inc., State College, Pa., a corporation of Delaware
Filed Aug. 1, 1955, Ser. No. 525,654
17 Claims. (Cl. 343—11)

My invention relates to band-compression mechanism particularly adaptable to radar or the like equipments and so devised as to compress into a single standard communication channel all the essential data necessary for the remote creation of a display representing the useful output of the radar or other equipment. Such devices have been disclosed by me in my copending patent applications, Serial No. 424,667, filed April 21, 1954, now U.S. Patent No. 2,861,263, granted November 18, 1958, and Serial No. 482,998, filed January 20, 1955, now U.S. Patent No. 2,883,658, granted April 21, 1959.

In application to radars, my band-compression device depends on redundancy in the radar video signal. It assumes that several sequential video trains can be summed into an equivalent slowed-down train, which includes all essential information of the original several trains. The argument for required bandwidth at the output of the compressor follows communication theory and may be expressed as follows. The bandwidth required is proportional to the product of the number of angularly resolvable elements per picture, of the number of range-resolvable elements per picture, and of the number of pictures or frames per second. Another factor involving signal-to-noise ratio may be brought in, but this is not pertinent to the present discussion. The stated bandwidth requirement implicitly assumes that the radar antenna-rotation rate is independently established and is "right" for the particular application. Thus, in prior application to radars, the third factor is assumed fixed, and the first and second factors are manipulated to arrive at suitable bandwidth for the particular circuit.

Limitations of the above concept are seen for a comparison of band-compression considerations for two different types of radar in current use. Data gathered by search radar must usually be integrated at an information center, and an antenna-rotation rate or scan rate of 6 r.p.m. is considered adequate. On the other hand, airport-surveillance radars must be able to follow fast-moving aircraft at closer range, and antenna speeds as high as 30 r.p.m. are often necessary. Nevertheless, the airport-surveillance radar is able to gather data of importance for search purposes, and it is desirable to use ordinary communication links to remotely transmit the essential video information gathered by an airport-surveillance radar. Using the above-expressed bandwidth considerations, the remote transmission of airport-surveillance-radar data on a standard communication link becomes an almost insurmountable problem, as will appear from the following comparative considerations for band-compression requirements for search radar and for airport surveillance radar.

As an example of search radar, one may assume an antenna-scan rate of 6 r.p.m., a beam width of 3 degrees, and a pulse-repetition rate suitable for search, e.g. 400 per second. Under certain conditions, it may be required to preserve 150 resolvable range elements for presenting a picture of 150 miles radius at one-mile resolution. The number of picture elements is then twelve times 150, or 1,800 elements per second, on the further assumption that there is only one picture element per beam width. The band compressors described in said copending applications have assumed that the remotely transcribed display should be presented at the same rate as the antenna scans for the parent radar. Thus, for the assumed situation involving search radar, the ultimately displayed frame or complete picture will take one antenna rotation or 10 seconds.

For purposes of comparison, one can assume that an airport-surveillance radar will have the requirement of 1,000-ft. range resolution, requiring an antenna speed of about 30 r.p.m. (if airplanes move 500 ft./sec.). The range of the airport radar may be 30 miles, so that 1000-ft. range resolution may be obtained with 150 range-resolvable elements. Under these assumptions, the number of elements per frame or picture is the same as for the search radar, namely 18,000 elements per frame. However the frame repetition is five times as fast, so that the demands on a communications link would be 9,000 picture elements per second, well beyond the capacity of any ordinary communications link. The cost of telephone lines is more or less proportional to bandwidth and so the cost to the user would be much higher to relay the airport picture, even though the number of picture elements in the total frame is identical with those for the search-radar case.

It is an object of the invention to provide improved band-compression means of the character indicated.

It is another object to produce means whereby bandwidth requirements for remote transmission of useful radar or the like data may be substantially reduced, as compared with existing methods.

Specifically, it is an object to provide a bandwidth compression device which may so substantially compress the essential video information from an airport or other short-range or rapid-scan radar that it may usefully serve search-intelligence purposes, while requiring essentially only a single conventional communication link for remote transmission.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is an electrical block diagram schematically showing component parts of a radar, band-compression device, and remote-display means of the invention; and FIG. 2 is a similar diagram illustrating an alternative form.

Briefly stated, my invention contemplates further band-compression beyond that disclosed above, to the extent that the essential data gathered by short-range or fast-scan radars and the like may be remotely transmitted on a single communication link having capacity to handle bandwidth of the order of 3 kc./s. I have used the term "count-down principle" to designate the mechanism for such further compression. According to the "count-down principle," for a first antenna rotation, a first sampled pattern of the available video intelligence is selected for compression into the communication link; and for the next antenna rotation, a second and staggered or interlaced pattern of samplings is compressed into the communications link. The sampled patterns may be staggered for two, three, or more antenna rotations, so that as many as five or more antenna rotations may be required to transmit all the video required for creation of a full frame.

Generally speaking, I show two different types of count-down mechanism, count-down in range and count-down in azimuth. Count-down in range is accomplished in such manner that, on a first antenna rotation, the band compressor loads the communications link with all the video necessary to create only a first increment of range in the ultimate display. During the next antenna rotation, the video for a second increment of range is transmitted, and so on for as many antenna rotations as necessary to complete all increments of range.

In the other general form, count-down in azimuth is effected in such manner that, for a first antenna rotation, a first pattern of angularly spaced azimuth strobes is selected for band compression and remote transmission. During the next antenna rotation, a second pattern of azimuth strobes is selected and compressed, and so on for as many rotations as necessary to complete the interlacing of azimuth-strobe patterns.

For the assumed situation in which the search-radar requirement is such as to allow ten seconds for the creation of a picture, and in which the airport-surveillance-radar requirement is such as to allow but two seconds for an antenna scan, I provide for "count-down" by a factor of five, so that, on completion of five antenna scans with the airport-surveillance radar, all video data for five range slices or for five interlaced patterns of azimuth strobes will have been transmitted through the single 3-kc./s. communications link. At the remote location where the data are transcribed, the display from the airport-surveillance radar will represent a complete frame in ten seconds and will therefore be on a comparable basis with the information developed from the search radar, which also requires ten seconds for presentation of a frame.

Referring to FIG. 1 of the drawings, my invention is shown in application to a PPI radar comprising a directional antenna 10 mounted to scan in azimuth and continuously driven by motor means 11. The radar includes a receiver 12 having a video amplifier 13 delivering signals representing successive video trains for successive increments of antenna rotation, there being one such train for each pulse transmitted by the radar. The band-compression device may in many respects resemble those discussed at greater length in said copending applications and may thus include a cathode-ray storage tube 14, intensity-modulated at 15 by the video output of the receiver amplifier 13. Mutually perpendicular deflection systems 16—17 may be excited by a sine-cosine generator 18 (and suitable amplifiers 19—20) to produce a circular sweep, as a base on which the intensity modulations may be displayed; a so-called J-scope or cardioid pattern 21 results, intensity-modulated by a new video train, for each outgoing radar pulse.

In order to scan the display 21, I show means including a reflecting surface 22 for imaging the pattern 21 at 21' on the path of movement of response of a scanner 23; the surface 22 is preferably semi-reflecting, to permit visual checking through optics 22'. The scanner 23 may include a lens 24 and a slit 25 in optical alignment with a photocell 26. The scanner 23 may be continuously recycled, as by belt drive from a motor 27. Synchronizing pulses used for orientation and reference in the ultimate display may be derived by a fixed magnetic or other pick-off 28 cooperating with means 29 carried by the scanner so as to provide one synchronizing pulse for each scanner rotation. The synchronizing pulse and the video output of the cell 26 may be fed directly to transmission means 30 supplying a conventional communication link, such as a telephone line or channel, said link being designated schematically at 31. Other intelligence on the same communication channel may include north-mark and antenna-rate signals reflecting appropriate azimuth and angular-rate synchronization with the antenna 10. Connections for these signals are schematically designated at 32.

In accordance with the invention, I provide means for counting-down or for sampling, with each antenna rotation a different predetermined fraction of the total available video from the receiver 12, and for so interlacing the pattern of sampling from one antenna rotation to the next that, for a given number of antenna rotations (five, in the assumed present case), a complete frame will have been sampled and compressed for transmission in the link 31. In the form shown in FIG. 1, count-down is accomplished in range, and this is effected by employing a gate 33 between the video amplifier 13 and the intensity-modulation connection 15 of the band compressor. The gate 33 is so devised as to function (for any particular antenna rotation) solely for the same fractional increment of range of the radar. Thus, for a first antenna rotation, the gate 33 may function for the range zero to six miles of a 30-mile picture. On the next antenna rotation, gate 33 will function for the next 6-mile range increment, namely, for the range 6 to 12 miles, and so on, until for the last or fifth antenna rotation gate 33 functions for the range 24 to 30 miles.

The described functioning of gate 33 may be achieved by employing a multivibrator 34 synchronized with the pulse-repetition rate of the radar and serving to subdivide or fractionate the period between pulses into the desired count-down interval; in the present assumed case, this involves division by five. Pulses developed by multivibrator 34 may be fed to a gate-pulse shaper 35, the arrangement being that the gate 33 will have an open period determined by a selected two adjacent pulses delivered by multivibrator 34. In order to select a particular two adjacent pulses utilized for shaping the gate-opening pulse, I show delay means 36 and a stepping device 37, synchronized by connection 38 with antenna rotation. The connection 38 will be understood to provide one incremental stepping function at 37 for each full rotation of the antenna 10, as for example upon each occurrence of a north mark, as described more fully in said copending applications. To complete the circuitry, I show a connection 40 from multivibrator 34 to the sine-cosine generator 18, whereby the sweep base or circumference of display circle 21 may represent the time between down-counted multivibrator pulses.

In operation, the sweep circle developed by deflection means 16—17 will recycle at a rate faster than the pulse-repetition rate of the radar by a factor reflecting the count-down factor achieved at 34, and the gate 33 will function to produce modulations on the sweep base only for a selected one of the multiple sweeps for each radar-pulse period. This same selected gate interval will apply for the video trains following all outgoing radar pulses, until completion of a full antenna rotation, at which time device 37 will advance the selected sampling interval or gate increment for the next full antenna rotation, and so on, for each successive antenna rotation, until all range increments for a complete picture have been covered and interlaced.

At the receiving end of the link 31, a suitable receiver 41 may incorporate means for channeling compressed video in a first line 42 for intensity-modulation (at 43) of a cathode-ray display tube 44. The deflection mechanism for the display tube 44 may include a yoke 45 continuously driven by means 46 synchronized with the north-mark reference and with the antenna rate, as suggested by connection 47; the data for such synchronization may be decoded by suitable means in the receiver 41, all as described in greater detail in said applications. Additionally, the receiver 41 may decode and segregate into a further line 48 signals reflecting scan synchronization in the band compressor, as, for example, signals developed by the device 28. These signals will involve one pulse per scanner rotation and may be used to synchronize a radial sweep generator 49. Generator 49 is connected to the deflection yoke 45 by way of a variable-bias device 50 under the control of an automatic stepping mechanism 51, which in turn may be tripped by north-mark signals, as suggested by connection 52.

In operation, therefore, and once the display at 44 has been properly synchronized with the transmission or band-compression end of the equipment, the device 51 will function to displace the bias 50 on the radial sweep once for each antenna rotation and by an amount such that for the first antenna rotation a full 360 degrees of the first down-counted range "slice" is presented in proper location on the face of tube 44, and such that for the second or next succeeding antenna rotation the next range "slice" will be properly presented adjacent the first presentation; and so on, until the full display has been completed after the required number of antenna rotations, which in the present assumed case is five.

In the arrangement of FIG. 2, count-down is accomplished in azimuth rather than in range and is also effected in the band-compression mechanism; but, since many parts of FIG. 2 correspond to parts of FIG. 1, they have been given the same reference numerals. Count-down in azimuth need not involve gating, except as an inherent function of the scanner 23 and, therefore, the video amplifier 13 is shown directly connected to the modulating means 15 for the storage tube 14. Count-down in azimuth results from appropriately gearing-down scanner rotation, in synchronized relation with antenna rotation, the arrangement being such as to produce one scanner rotation during a period exceeding (by the desired count-down factor) the antenna-rotation period divided by the antenna-beam width. Under such circumstances, successive scans for scanner 23 will represent azimuth strobes spaced from each other by more than the beam width of the antenna 10. By appropriate design of the gear mechanism 55, which synchronizes antenna rotation with scanner rotation, the azimuth strobes for a first antenna rotation can be caused to interlace with those for succeeding rotations.

With the described arrangement, the slowed-down video developed by photocell 26 of FIG. 2 will represent a given plurality of radial strobes for a first rotation of the antenna; the strobes will be equally spaced by substantially the count-down factor (5) times the beam width. On the next antenna rotation, the strobes will be similarly spaced but incrementally advanced with respect to the strobes of the first rotation. Strobe patterns will precess in this manner for successive rotations of the antenna until completion of a plurality of antenna rotations corresponding to the count-down factor, by which time all strobe patterns will have interlaced to complete a full frame.

At the receiving end of the remote-transmission link 31', a receiver 41' may segregate video and scan-synchronizing signals into separate channels 42'—48', and additionally provide north-mark and antenna-rate intelligence in a line 47' to govern the yoke-drive motor 46' of display means 44'. The video-signal line 42' may continuously intensity-modulate the display, and the strobe sweeps developed by generator 49' may recycle in synchronism with scan action in the band compressor. A fully displayed frame will be repeated on completion of $n$ antenna rotations, where $n$ is the count-down factor.

It will be seen that I have described improved band-compression means of the character indicated. My compressor permits accommodation of radar intelligence in standard narrow-band communication links, without sacrifice of the quantity of intelligence needed at the remote-display location; the reason for this is that the radar generates far more intelligence than is needed for remote display. Even so, should there develop a need at the remote location for display of all the detail available from the parent radar at a particular localized region of interest, a simple temporary control modification of the band compressor will permit the desired selection; for example, selectively operable means, suggested by the push button 37' in FIG. 1, may effectively disconnect or temporarily disable the stepping device 37, so that at a particular step thereof (corresponding to a selected range slice of interest) all the video signals furnished by the airport-surveillance radar may be compressed into the same single communications link. A similar control 51' (which may be coordinated with control 37' by means not shown) for the remote stepping device 51 will serve to "freeze" the selected range slice for display at 44, as will be understood.

While I have specifically described and illustrated the processes of count-down in range and count-down in azimuth, there are other evident ways of implementing the same general principle. For example, the needs for remote-display purposes may be adequately met by effectively reducing the number of range-resolvable element in the intelligence that is transmitted; the way to do this is to speed up the scanner 23, because if the bandwidth of the system is limited, range-resolution decreases at the same rate as scanner (23) speed increases. Thus, if 30 instead of 150 range-resolvable elements were satisfactory in the device of FIG. 2, the picture rate of 1800 elements/sec. could be achieved for a strobe rate of 60 per second, meaning picture completion at the same rate as parent-radar scan. In practice, the count-down principle may be combined with a reduction of the number of range-resolvable elements, as by using azimuth interlace of only two pictures (sampling patterns) and a scanner (23) rate of 30 per second; this will mean that the FIG. 2 device with scanner 23 driven at 30 rotations/sec. could remotely transmit a complete picture over a standard communication channel in the time required for two antenna rotations (4 seconds, in the assumed case).

While I have described my invention in detail for the preferred forms shown, it will be understood that modifications may be made within the scope of the invention as defined in the claims which follow.

I claim:

1. In combination, a scanning radar, including a directional antenna and continuously driven means for driving said antenna through a recycling scan pattern, a radar receiver connected to said antenna, band-compression means for slowing down video signals from said receiver, gate means connecting the video output of said receiver to said band-compression means, the open period of said gate means being a fraction of the pulse-repetition period of said radar, means synchronized with the pulse-repetition rate of said radar for operating said gate means, and means synchronized with rotation of said antenna for periodically stepping the phase of operation of said gate means in said pulse-repetition period.

2. The combination of claim 1, in which said last-defined means includes means stepping said phase once for each antenna-scan period.

3. In combination a PPI radar including a rotated antenna and a receiver developing successive trains of video signal for successive increments of antenna rotation, and band-compression means responsive to the video output of said receiver and including sampling means synchronized with antenna rotation and developing a first definite pattern of sampling said video output for a first period of antenna rotation, said sampling means developing a second definite and different pattern of sampling said video output for a second period of antenna rotation, the total sampled and hand-compressed video for any one of said periods of rotation of said antenna representing a fraction of the total video signal available for band compression.

4. In combination, a PPI radar including a rotated antenna and a receiver developing successive trains of video signal for successive increments of antenna rotation, band-compression means responsive to the video output of said receiver and including sampling means synchronized with antenna rotation and periodically sampling said video output, said sampling means being so synchronized with antenna-rotation rate that for a first rotation of said antenna said sampling means yields compressed video for a first series of angularly spaced azimuth strobes in the ultimate PPI display, and so that for a second rotation of said antenna said sampling means yields compressed video for a second series of azimuth strobes interlaced with said first series.

5. In combination, a PPI radar including a rotated antenna and a receiver developing successive trains of video signal for successive increments of antenna rotation, band-compression means responsive to the video output of said receiver and including sampling means synchronized with antenna rotation and periodically sampling said video output, said sampling means including a gate having an open interval representing a fraction of the pulse-repetition period of said radar, said synchronizing means being so related to the antenna-rotation period that for a first rotation of said antenna said sampling means yields compressed video for a first gated range, and so that for a second rotation of said antenna said sampling means yields compressed video for a second gated range.

6. In combination, a PPI radar including a rotated antenna and a receiver developing successive trains of video signal for successive increments of antenna rotation, band-compression means responsive to the video output of said receiver and including time-multiplexing means synchronized with antenna rotation but having a cyclic period representing a plurality of periods of antenna rotation, said multiplexing means successively sampling regularly spaced fragments of said video signal, said fragments being of time duration representing a relatively small fraction of the antenna-rotation period.

7. In combination, a PPI radar including a rotated antenna and a receiver developing successive trains of video signal for successive increments of antenna rotation, time-multiplexing means synchronized with antenna rotation and sampling a first fractional range interval of said trains for a first antenna rotation and a second fractional range interval for a second antenna rotation, and band-compression means responsive to the video output of said multiplexing means.

8. In combination, a PPI radar including a rotated antenna and a receiver developing successive trains of video signal for successive increments of antenna rotation, band-compression means connected to said receiver and responsive to the video output thereof, and time-multiplexing means synchronized with antenna rotation and sampling compressed video representing a first series of spaced azimuth strobes for a first antenna rotation and a second series of spaced azimuth strobes for a second antenna rotation.

9. In combination, a PPI radar including a rotated antenna and a receiver developing successive trains of video signal for successive increments of antenna rotation, band-compression means including a cathode-ray storage device modulated with the video output of said receiver, sweep means for said storage device and having a recurrence frequency synchronized with the recurrence frequency of said successive trains, the display base of said sweep means having a total extent representing a fraction of the period of said successive trains, means including a photoelectric cell scanning said cathode-ray tube at a relatively slow rate compared with the repetition rate of said successive trains, and means synchronized with antenna rotation for time-displacing within said period between said successive trains the time-occurrence of that fraction which represents the sweep base in the display on said cathode-ray tube, whereby for a first period of time said scanner produces a band-compressed output reflecting a first fraction of the range of said radar, and whereby during a second period of time said scanner develops a band-compressed video output reflecting a second fraction of the range of said radar.

10. The combination of claim 9, in which said time-displacement occurs once for each complete antenna rotation.

11. In combination, a PPI radar including a rotated antenna and a receiver developing successive trains of video signals for successive increments of antenna rotation, band-compression means including a cathode-ray tube modulated by the video output of said receiver, sweep means establishing a display base on said tube representing range of said radar, and means including a photoelectric cell scanning along the display base of said tube at a much slower rate than the repetition rate of said successive trains, said scanner being synchronized with antenna rotation in such manner that a cycle of said scanner has a period greater than the time required for the antenna to rotate one beam width, whereby the video output of said photocell reflects azimuth strobes having angular spacings exceeding the antenna beam width.

12. The combination of claim 11, in which the relationship between antenna rotation and scanner cycling is such that for a first rotation of said antenna a first set of angularly spaced azimuth strobes is scanned and such that for the successive antenna rotation a second set of angularly spaced azimuth strobes is scanned, said sets being angularly interlaced.

13. In combination, a PPI radar including a rotated antenna and a receiver developing succesive trains of video signal for successive increments of antenna rotation, band-compression means responsive to the video output of said receiver and developing therefrom a slowed-down video for remote transmission, said band-compression means including count-down mechanism sampling a first definite pattern of fragments of the total received video signal during a first antenna rotation and a second similar but different pattern for a second antenna rotation, said patterns being interlaced so as to establish the accumulation of substantially twice as much frame data for two antenna rotations as for one antenna rotation, remote-transmission means connected to the output of said band-compression means, and remote display means modulated by the remotely transmitted output of said band-compression means.

14. The combination of claim 13, in which said count-down mechanism divides the remotely transmitted data into increments of azimuth, there being a first pattern of azimuth strobes remotely transmitted for a first antenna rotation and there being a second pattern of azimuth strobes remotely transmitted for a second antenna rotation.

15. In combination, a scanning radar, including a directional antenna and continuously driven means for driving said antenna through a recycling scan pattern, a radar receiver connected to said antenna, band-compression means for slowing down video signals from said receiver, gate means connecting the video output of said receiver to said band-compression means, the open period of said gate means being a fraction of the pulse-repetition period of said radar, means synchronized with the pulse-repetition rate of said radar for operating said gate means, and selectively operable means for selecting a particular phase of operation of said gate means for remote transmission.

16. In combination, a scanning radar, including a directional antenna and continuously driven means for driving said antenna through a recycling scan pattern, a radar receiver connected to said antenna, band-compression means for slowing down video signals from said receiver, gate means connecting the video output of said receiver to said band-compression means, the open period of said gate means being a fraction of the pulse-repetition period of said radar, means synchronized with the pulse-repetition rate of said radar for operating said gate means, means synchronized with rotation of said antenna for periodically stepping the phase of operation of said gate means in said pulse-repetition period, and selectively operable means in controlling relation with said last-defined means for disabling the stepping function of said last-defined means at a selected step thereof.

17. In combination, a PPI radar including a rotated antenna and a receiver developing successive trains of video signal for successive increments of antenna rotation, band-compression means responsive to the video output of said receiver and developing therefrom a slowed-down video for remote transmission, said band-compression means including count-down mechanism sampling a first pattern of fragments of the total received video signal during a first antenna rotation and a second similar pattern for a second antenna rotation, said count-down mechanism dividing the remotely transmitted information into successive range increments involving for a first antenna rotation a first range increment, and for a second antenna rotation a second range increment, whereby said patterns are interlaced so as to establish the accumulation of substantially twice as much frame data for two antenna rotations as for one antenna rotation, remote-transmission means connected to the output of said band-compression means, and remote display means modulated by the remotely transmitted output of said band-compression means.

References Cited in the file of this patent

UNITED STATES PATENTS 2,412,670     Epstein _____ Dec. 17, 1946

UNITED STATES PATENT OFFICE
CERTIFICATE OF CORRECTION

Patent No. 2,991,465                                       July 4, 1961

John L. McLucas

It is hereby certified that error appears in the above numbered patent requiring correction and that the said Letters Patent should read as corrected below.

Column 6, line 58, for "hand-compressed" read -- band-compressed --.

Signed and sealed this 28th day of November 1961.

(SEAL)
Attest:

ERNEST W. SWIDER                                      DAVID L. LADD
Attesting Officer                                       Commissioner of Patents

USCOMM-DC